United States Patent [19]

Jones et al.

[11] Patent Number: 4,499,059

[45] Date of Patent: Feb. 12, 1985

[54] IN-LINE INJECTION OF ALKALINE ABSORBANT TO REMOVE $H_2S$

[75] Inventors: Timothy A. Jones, Dallas; Earl S. Snavely, Jr., Arlington, both of Tex.

[73] Assignee: Mobil Oil Corporation, New York, N.Y.

[21] Appl. No.: 552,240

[22] Filed: Nov. 16, 1983

[51] Int. Cl.³ .................. C01B 17/05; B01D 53/34
[52] U.S. Cl. .................... 423/226; 423/224; 423/228; 423/234; 423/573 R; 423/DIG. 9
[58] Field of Search ............ 423/220, 224, 226, 228, 423/229, 232, 234, 573 R, 573 G, DIG. 9

[56] References Cited

U.S. PATENT DOCUMENTS

| Re. 18,958 | 9/1933 | Bottoms | 423/228 |
|---|---|---|---|
| 2,083,213 | 6/1937 | Baehr et al. | 423/228 |
| 2,161,663 | 6/1939 | Baehr et al. | 423/228 |
| 2,747,962 | 5/1956 | Heitz et al. | 423/236 |
| 3,286,992 | 11/1966 | Armeniades et al. | 423/DIG. 9 |
| 4,009,251 | 2/1977 | Meuly | 423/226 |
| 4,085,192 | 4/1978 | Van Scoy | 423/226 |
| 4,293,531 | 10/1981 | Field et al. | 423/232 |
| 4,325,923 | 4/1982 | Botton et al. | 423/234 |

OTHER PUBLICATIONS

R. W. Hohlfeld, "Selective Absorption of $H_2S$ From Sour Gas", Apr. 1979, SPE 7972, pp. 1-8.
Ronald W. Hohlfeld, "New $H_2S$ Scrubber Cleans Small or Large Gas Streams", Oil & Gas Journal-Oct. 15, 1979, pp. 129-130.

Primary Examiner—Earl C. Thomas
Assistant Examiner—Jeffrey E. Russel
Attorney, Agent, or Firm—Alexander J. McKillop; Michael G. Gilman; Charles J. Speciale

[57] ABSTRACT

Hydrogen sulfide is removed from a gas stream by injecting an alkaline solution into the gas stream. The velocity of the gas stream is such that it has a Reynolds number of at least 50,000 and the Weber number for the injected alkaline solution is at least about 16. Alkali metal hydroxides and polyvalent metal chelates are useful alkaline solutions.

15 Claims, 1 Drawing Figure

4,499,059

IN-LINE INJECTION OF ALKALINE ABSORBANT TO REMOVE H₂S

CROSS REFERENCE TO RELATED APPLICATIONS

Application Ser. No. 361,947, filed by the present inventors on Mar. 25, 1982, is directed to a process for selective removal of hydrogen sulfide from a gaseous stream by contacting the stream with a polyvalent metal chelate solution in a static mixer. Removal of the hydrogen sulfide is accomplished through oxidation to elemental sulfur. The polyvalent metal may be selected from iron, copper, manganese, lead, mercury, paladium, platinum, tungsten, nickel, chromium, cobalt, vanadium, titanium, tantalum, zirconium, molybdenum and tin, preferably iron, copper and manganese, and most preferably iron. The chelating agent may be selected from amino acetic acids derived from ammonia or 2-hydroxyalkylamines, such as glycine, diglycine (aminodiacetic acid), nitrilo triacetic acid, 2-hydroxyalkylglycine, di-hydroxyalkylglycine and hydroxyethyl or hydroxypropyldiglycine, amino acetic acids derived from ethylene diamine, diethylene triamine, 1,2-propylenediamine and 1,3-propylenediamine, such as EDTA, 2-hydroxy EDTA, and diethylene triamine pentacetic acid, amino acetic acid derivatives of cyclic 1,2-diamines, such as 1,2-diaminocyclohexane-N, N-tetraacetic acid, and amides of polyamino acetic acids, as disclosed in U.S. Pat. No. 3,580,950 to Bersworth. EDTA is particularly preferred.

Application Ser. No. 395,896, filed by the present inventors on July 7, 1982, is directed to the selective removal of hydrogen sulfide from a gaseous stream using an alkaline liquid in a static mixer. The alkaline liquid may be selected from aqueous solutions of inorganic salts having an alkaline reaction, such as alkali metal hydroxides, phosphates, borates, metaborates or arsenites, solutions of organic bases, such as alkanolamines, like monoethanol amine, diethanolamine, triethanolamine, n-methyldiethanolamine, alkanoldiamines, alkenylpolyamines, or solutions of salts of weak organic acids, such as amino carboxylic acids and aminosulfonic acids, or other alkaline liquids. Alkali metal hydroxides and alkanolamines are preferred, particularly diethanolamine and N-methyldiethanolamine, which show high selectivity towards H₂S and not CO₂, along with highly efficient H₂S absorption.

In each of the above applications, selective absorption of hydrogen sulfide without removal of carbon dioxide is achieved by limiting the gas-liquid contact time to about 0.1 sec. or less. The disclosures of each of the above applications are incorporated herein by reference.

BACKGROUND OF THE INVENTION

1. Field of the Invention

The present invention is directed to the removal of hydrogen sulfide from a gaseous stream, and particularly the selective removal of hydrogen sulfide. It has long been known that hydrogen sulfide, which can be present in waste gases liberated during chemical and industrial processes, such as the pulping of wood, natural gas and crude oil production and petroleum refining, has an offensive odor, may damage vegetation and painted surfaces, and can constitute a significant health hazard to wildlife and humans. Government enforced regulations have imposed ever lower tolerances on the amount of hydrogen sulfide which can be vented to the atmosphere, in some localities requiring removal of virtually all of the hydrogen sulfide.

In general, the absolute quantities of hydrogen sulfide are not very high. For example, stack gases resulting from the concentration of waste pulping liquor from the craft pulping process contain about 500-2000 ppm of hydrogen sulfide. See U.S. Pat. No. 3,071,433 to Dunn. However, hydrogen sulfide odor can be detected by humans at concentrations as low as 0.01 ppm. Thus, a process for removal of hydrogen sulfide must be extremely efficient.

Carbon dioxide often is found along with hydrogen sulfide in the gas streams. However, it is desirable to remove only the hydrogen sulfide and not the carbon dioxide, to prevent unnecessary consumption of the solution which removes the hydrogen sulfide.

2. Description of the Prior Art

In the past, it has been known that hydrogen sulfide can be removed selectively from a gas stream containing carbon dioxide by using an alkaline liquid, such as caustic soda, and maintaining a very short contact time, about 0.02 sec. See U.S. Pat. No. 2,747,962 to Heitz, et al. It is also known that an alkaline solution can be sprayed countercurrent to a flow of waste gas to remove hydrogen sulfide. See U.S. Pat. No. 2,083,213 to Baehr, et al and Hohlfeld, "Selective Absorption of H₂S From Sour Gas", Society of Petroleum Engineers, Paper 7972, Copyright 1979 to the American Institute of Mining, Metallurgical and Petroleum Engineers, and presented at the California Regional Meeting of the Society of Petroleum Engineers held April 18-20, 1979 Ventura, Calif. A shorter version of the Hohlfeld paper appears at pages 129-130 of the Oct. 15, 1979 issue of the Oil and Gas Journal.

SUMMARY OF THE INVENTION

It is an object of this invention to provide a system for removal of hydrogen sulfide from a gas stream.

It is a further object of this invention to provide a system for the efficient and selective removal of hydrogen sulfide from a gas stream.

The above objects and others are obtained by providing a system wherein an alkaline solution is injected into a turbulent gas flow at a given Reynolds number and a given Weber number. Selectivity is achieved by separating the gas from the injected liquid a very short time after the injection.

DETAILED DESCRIPTION OF THE INVENTION

Figure 1:
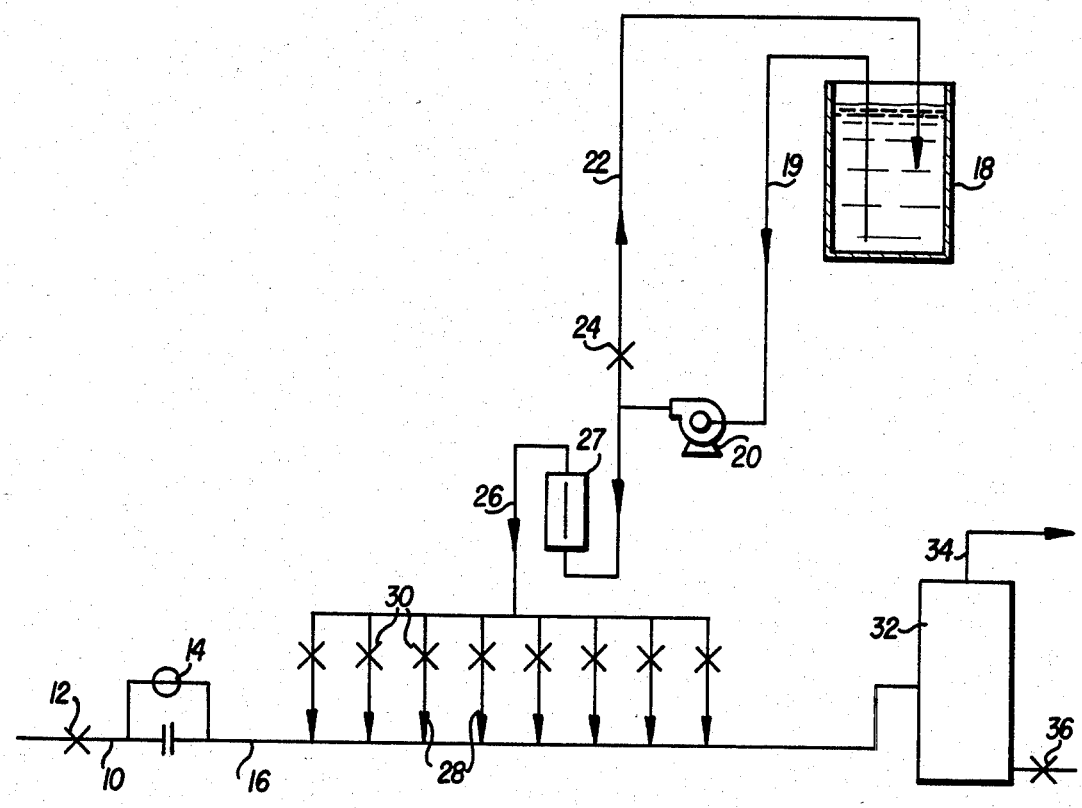
FIG. 1 shows a schematic diagram of a system according to the present invention.

Referring to FIG. 1, gas enters through gas inlet line 10, which is provided with valve 12 and meter 14. The gas then enters treating line 16. An alkaline solution is stored in reservoir 18, and is pumped through lines 19 and 26 with pump 20. Return line 22 is provided with valve 24. From line 26, the alkaline solution is forced through metering device 27 to injector lines 28, which are provided with valves 30. The alkaline solution is injected into the line 16 through injector lines 28 and is carried to separator 32. Thus, the present process uses co-current liquid and gas flows. Any known liquid-gas separator can be used. To absorb hydrogen sulfide selectively while leaving carbon dioxide in the gas stream, the gas-liquid contact time between injection and separation should be limited to less than 0.1 sec., preferably less than 0.08 sec. and most preferably less than 0.03 sec. The contact time preferably is not less than about 0.01 sec. Treated gas is vented from the separator through line 34, while liquid is removed through valved line 36. It is contemplated that injector lines 28 could be nozzles. However, the system is functional if the injector lines 28 are merely straight tubes which intersect line 16.

It is important that the gas flow in the treating line 16 have a Reynolds number of at least 50,000, preferably at least 150,000, and most preferably at least 300,000. Those skilled in the art will recognize that a Reynolds number of 10,000 generally indicates a highly turbulent gas flow. As is known, the Reynolds number is a function of line diameter, gas velocity, gas density, and the viscosity of the gas.

Another important consideration is the Weber number, which is related to the droplet formation of the injected alkaline solution. The drop size of a liquid dispersed in a gas flow decreases with increasing Weber number. The Weber number is defined as $D.v^2.p/t$, where D is the injected liquid drop diameter, v is relative gas velocity with respect to the droplet velocity in the tube, p is the density of the gas and t is the interfacial tension. A Weber number of at least about 16, preferably about 16–140, and most preferably about 50–140, is necessary for the present invention.

The combination of the minimum Reynolds number and minimum Weber number provides suitable conditions so that the injected liquid is broken up into very small particles. The small particles provide an increased liquid surface area to allow for an efficient mass transfer for the reaction of the hydrogen sulfide. Preferably, the liquid coming off the injector pipes forms droplets about 0.08 inches in diameter, which become dispersed to a particle size of about 0.001 inches in the turbulent conditions.

The amount of liquid injected for a given volume of gas (the gas-to-liquid volume ratio) depends upon the amount of contaminant in the gas and the concentration of the injected alkaline solution. The ratio will decrease with increasing contaminant concentration and also will decrease with decreasing alkaline solution concentration. For a highly contaminated gas stream (2,000 ppm $H_2S$ or more) the ratio may be as low as the range of 30 to 100. For slightly contaminated streams, using relatively concentrated alkaline solutions, the ratio may be 30,000 or more. When the chelate is used for the alkaline solution, the ratio generally will not exceed 1,000. When 5% NaOH is used, the ratio generally will not exceed 10,000.

The solutions described in Ser. Nos. 361,947 and 395,896 as described above are useful as the present alkaline solutions. Polyvalent metal chelates and alkaline metal hydroxides, especially sodium hydroxide, are preferred. The concentration of the alkaline solution will depend upon the concentration of hydrogen sulfide in the gas. The upper limit on concentration for a polyvalent metal chelate solution is determined by the solubility limits of the chelate, generally about 0.1 molar. For practical reasons, an upper limit for the sodium hydroxide is about 10% by weight or 2 molar. As described in Ser. No. 361,947, the pH of the chelate solution preferably is between 7.5 and 11.

The solutions described in Table 1 below were used to absorb hydrogen sulfide from a gas stream contaminated with about 5 ppm hydrogen sulfide. Referring again to FIG. 1, lines 10 and 16 were 2-inch diameter pipes. Lines 19, 22 and 26 were ½-inch diameter pipes, while injectors 28 were ⅛-inch tubes which opened into line 16. The gas flow velocity ranged from about 3000 to about 30,000 standard cubic feet per hour, and the rate of solution injection was about 0.15 to 1.3 gal/min for the chelates, about 0.13 to 0.23 gal/min for the caustic. The chelates in Table 1 are iron-EDTA chelates.

TABLE 1

| Solution Number | Stock Solution | Final Concentration G-Mole/Liter | pH Adjusted | pH |
|---|---|---|---|---|
| 1 | *Dow Iron Chelate | .021 | Ammonium Carbonate | 9.0 |
| 2 | *Dow Iron Chelate | .057 | Ammonium Carbonate | 8.8 |
| 3 | **Air Resources Iron Chelate | .021 | None | 9.8 |
| 4 | *Dow Iron Chelate | .021 | Ammonium Carbonate | 8.8 |
| 5 | *Dow iron Chelate | .038 | Ammonium Carbonate | 9.0 |
| 6 | *Dow Iron Chelate | .021 | Ammonium Carbonate | 9.0 |
| 7 | *Dow Iron Chelate | .038 | Ammonium Carbonate | 9.0 |
| 8 | Sodium Hydroxide | 0.45 | None | 12.0 |

*Dow Chemical Company
**Air Resources, Inc.

The tests conducted and the results of the tests are shown in Table 2.

TABLE 2

| Run | Gas/Liquid | Percentage of $H_2S$ Removed | $N_{Re}$ | $N_{We}$ | Residence Time (Sec) | Gas Flow Rate (SCFH) | Solution Flow Rate (gal/min) |
|---|---|---|---|---|---|---|---|
| 1A | 2100 | 25 | 61000 | 1.5 | .427 | 3900 | 0.23 |
| 1B | 1000 | 38 | 61000 | 1.5 | .427 | 3900 | 0.50 |
| 1C | 600 | 38 | 61000 | 1.5 | .427 | 3900 | 0.83 |
| 1D | 4800 | 15 | 141000 | 12.8 | .185 | 9100 | 0.23 |
| 1E | 2100 | 40 | 132000 | 12.8 | .197 | 9100 | 0.50 |
| 1F | 1200 | 40 | 132000 | 12.8 | .197 | 9100 | 0.83 |
| 2A | 5600 | 50 | 163000 | 16.8 | .160 | 10500 | 0.23 |
| 2B | 2600 | 50 | 163000 | 16.8 | .160 | 10500 | 0.50 |
| 2C | 1300 | 50 | 163000 | 16.8 | .160 | 10500 | 1.00 |
| 2D | 9100 | 50 | 263000 | 44.5 | .096 | 17000 | 0.23 |
| 2E | 4200 | 75 | 263000 | 44.5 | .096 | 17000 | 0.50 |
| 2F | 2100 | 75 | 263000 | 44.5 | .096 | 17000 | 1.00 |
| 3A | 9100 | 20 | 263000 | 44.5 | .096 | 17000 | 0.23 |
| 3B | 4200 | 20 | 263000 | 44.5 | .096 | 17000 | 0.50 |
| 3D | 2100 | 40 | 263000 | 44.5 | .096 | 17000 | 1.00 |
| 3E | 3700 | 50 | 230000 | 34.7 | .112 | 15000 | 0.50 |
| 3F | 9100 | 40 | 263000 | 44.5 | .096 | 17000 | 0.23 |

TABLE 2-continued

| Run | Gas/Liquid | Percentage of H₂S Removed | $N_{Re}$ | $N_{We}$ | Residence Time (Sec) | Gas Flow Rate (SCFH) | Solution Flow Rate (gal/min) |
|---|---|---|---|---|---|---|---|
| 3G | 25000 | 0 | 263000 | 44.5 | .096 | 17000 | 0.15 |
| 3H | 1600 | 40 | 263000 | 44.5 | .096 | 17000 | 1.33 |
| 4A | 10000 | 0 | 289000 | 54.9 | .096 | 18600 | 0.23 |
| 4B | 4200 | 20 | 263000 | 44.5 | .096 | 17200 | 0.50 |
| 4C | 2100 | 40 | 263000 | 44.5 | .096 | 17200 | 1.00 |
| 4D | 1100 | 40 | 263000 | 44.5 | .096 | 17200 | 1.33 |
| 5A | 3800 | 40 | 237000 | 36.2 | .109 | 15300 | 0.50 |
| 5B | 1900 | 50 | 237000 | 36.2 | .109 | 15300 | 1.00 |
| 6A | 16000 | 60 | 465000 | 137 | .112 | 30000 | 0.23 |
| 6B | 8000 | 60 | 465000 | 137 | .112 | 30000 | 0.50 |
| 7A | 7000 | 40 | 434000 | 120 | .12 | 28000 | 0.50 |
| 7B | 3500 | 70 | 434000 | 120 | .12 | 28000 | 1.00 |
| 7C | 2600 | 60 | 434000 | 120 | .12 | 28000 | 1.33 |
| 8A | 10700 | 100 | 325500 | 67.9 | .16 | 21000 | 0.23 |
| 8B | 28000 | 100 | 300000 | 67.9 | .16 | 21000 | 0.13 |

It is believed that the relatively low removal percentages for the chelates are due to the very low concentration of hydrogen sulfide. It is expected that the chelate solutions would remove much higher percentages from gas streams having higher hydrogen sulfide percentages.

As described in Ser. No. 361,947, the chelate solution removes hydrogen sulfide through oxidation of the sulfide to elemental sulfur by the chelate solution. The reduced chelate solution can be regenerated by oxidation to the higher valence state and separation of the solid sulfur. Because of this, use of a metal such as iron, which can be oxidized to the ferric state by oxygen or oxygen-containing room air, is preferred. When the sodium hydroxide or organic base solution is used, regeneration is not carried out. Instead, the solution is transported to known hazardous waste storage wells.

Although a detailed description and specific examples have been set forth above, the present invention should not be considered as being limited thereto. Rather, modifications will be apparent to those skilled in the art which will not vary from the spirit of the present invention, the scope of which is set forth in the following claims.

What is claimed is:

1. A method for removing hydrogen sulfide from a hydrogen sulfide-contaminated gas stream, comprising:
 supplying a hydrogen sulfide-containing gas to a pipe at a velocity so that said gas has a Reynolds number of at least 150,000;
 injecting an alkaline liquid into said pipe at a Weber number of at least about 16 to absorb hydrogen sulfide from said gas stream; and
 separating said injected liquid from said gas stream.

2. The method of claim 1, wherein said alkaline solution is a solution of at least one of a polyvalent metal chelate, an alkanol amine or a hydroxide ion source.

3. The method of claim 2, wherein said alkaline solution is a polyvalent metal chelate solution.

4. The method of claim 3, wherein the concentration of said chelate solution is no more than about 0.1 molar.

5. The method of claim 2, wherein said alkaline solution is a solution of sodium hydroxide.

6. The method of claim 5, wherein the concentration of said sodium hydroxide solution is no more than about 2 molar.

7. The method of claim 1, wherein said gas stream also includes carbon dioxide, said method further comprising limiting the gas-liquid contact time between injection and separation to not more than 0.1 sec. to absorb hydrogen sulfide and not carbon dioxide.

8. The method of claim 1, wherein said injected solution forms droplets about 0.08 inch in diameter.

9. The method of claim 8, wherein said droplets are dispersed to a particle size of about 0.001 inch.

10. The method of claim 1, wherein the gas-to-liquid volume ratio is at least about 30.

11. The method of claim 4, wherein the gas-to-liquid volume ratio is no more than about 1000.

12. The method of claim 6, wherein the gas-to-liquid volume ratio is no more than about 10,000.

13. The method of claim 1, wherein the Reynolds number is at least about 300,000.

14. The method of claim 1, wherein the Weber number is about 16 to 140.

15. The method of claim 14, wherein the Weber number is about 50 to 140.

* * * * *